M. P. HATHAWAY.
Coffee-Pot Attachment.
No. 228,632.  Patented June 8, 1880.
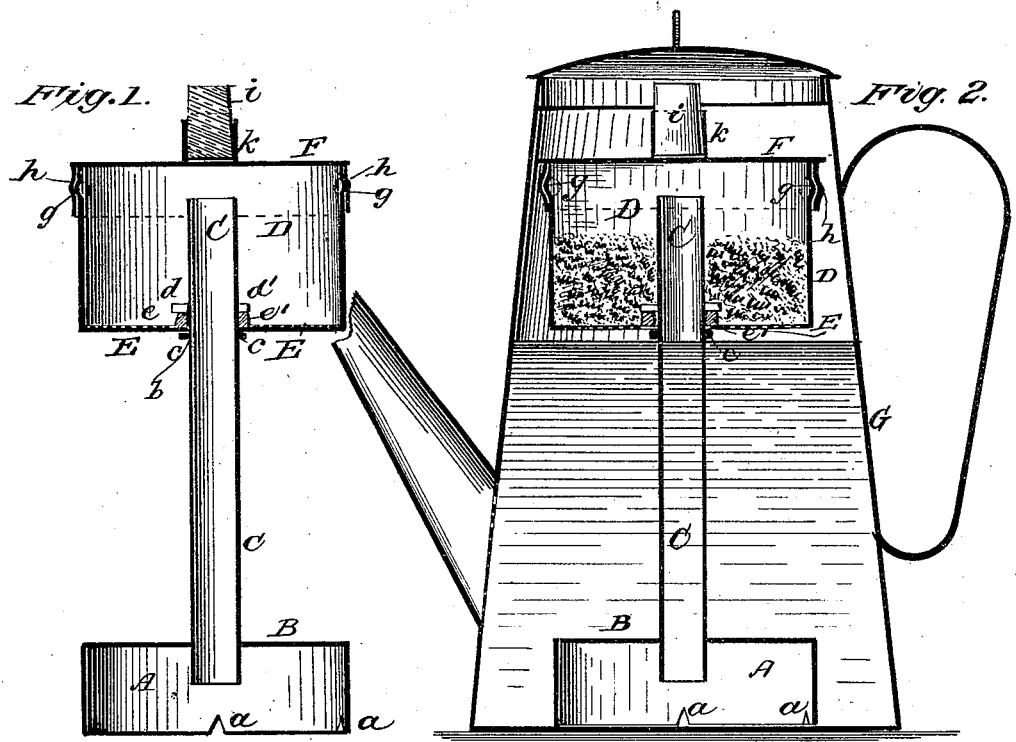
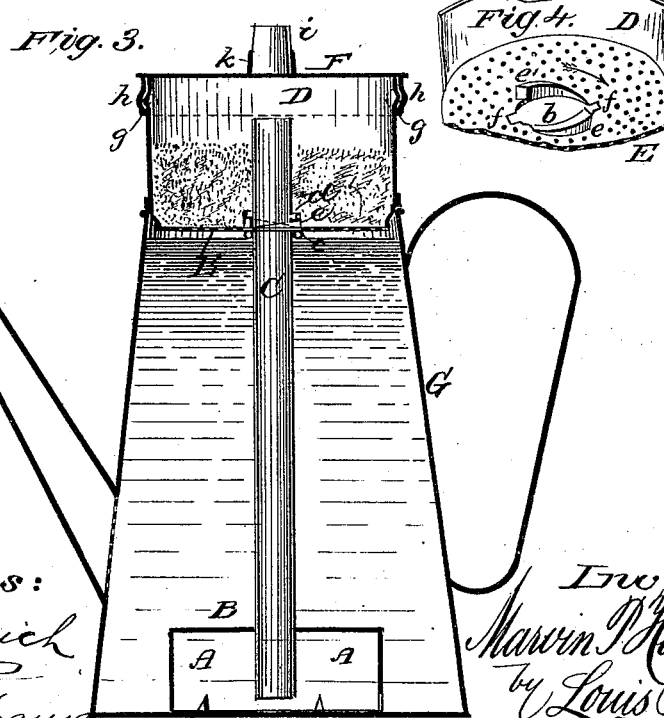
Witnesses:
Fred. G. Dieterich
Albert H. Krause
Inventor:
Marvin P. Hathaway
by Louis Bagger & Co.
Attorneys

UNITED STATES PATENT OFFICE.

MARVIN P. HATHAWAY, OF DECORAH, IOWA.

COFFEE-POT ATTACHMENT.

SPECIFICATION forming part of Letters Patent No. 228,632, dated June 8, 1880.

Application filed December 22, 1879.

*To all whom it may concern:*

Be it known that I, MARVIN P. HATHAWAY, of Decorah, in the county of Winneshiek and State of Iowa, have invented certain new and useful Improvements in Coffee-Pot Attachments; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical axial section of my improved attachment. Fig. 2 is a similar view, showing the attachment inserted into a coffee-pot. Fig. 3 is a sectional view, representing a somewhat modified construction and arrangement of the attachment; and Fig. 4 is a perspective detail view, illustrating the construction of the catch or device for securing the coffee receptacle or holder upon its tubular standard.

Similar letters of reference indicate corresponding parts in all the figures.

My invention has relation to that class of attachments for coffee-pots known as "percolators;" and it consists in the improvements hereinafter described, and particularly pointed out in the claims.

In the drawings, A is a hollow cylinder, closed on top by a cover, B, which has a central aperture, into which is inserted and soldered a vertical tube, C. The lower rim of the cylinder or base A has a series of notches or slots, (denoted by $a$,) and the central tube, C, extends down into the cylindrical base A until within a short distance of its open bottom, as clearly shown in the drawings.

The upper part of tube C has an annular shoulder, $c$, a short distance above which are two laterally-projecting lugs, $d\ d'$, set diametrically opposite to each other.

D is a cylindrical vessel, of a diameter corresponding (preferably) to that of A, which is provided with a foraminated bottom, E, and a closely-fitting cover, F.

The upper rim of the vessel D is made with two or more protuberances, $g\ g$, which register with and fit into indentations $h\ h$ in the rim of the cover F, so that this may be sprung upon the vessel and held firmly in place thereon.

The foraminated bottom E of the vessel D has a central aperture, $b$, on opposite sides of which are inclined lugs $e\ e'$, separated by slots $f f$, so that the cylindrical vessel D E may be inserted upon the tubular standard C by turning it so as to cause its notches $f f$ to register with the studs $d\ d'$, and then inserting the tube through the aperture $b$ until bottom E rests upon the annular flange or shoulder $c$, when, by turning the vessel to the right, it is screwed down upon and interlocked with the studs $d\ d'$, as shown in the drawings, so that the detachable vessel D E will be firmly attached upon its tubular standard, the slots $f f$ in its bottom being covered or closed by the projecting annular flange or shoulder $c$ below, so that none of the ground coffee can escape through the said slots and fall down into the pot.

The removable cover F is provided with a knob or handle, which consists of a cork or piece of pith or soft wood, $i$, the lower wide end of which is inserted into a tapering sleeve, $k$, which is soldered centrally upon the top of the cover. That part of the cork $i$ which projects up above the sleeve forms the handle, which, no matter how hot the metallic parts of the cover may be, will never be so hot that it cannot be handled; and as the cover F is interlocked by its indentations $h\ h$ with the vessel D E, and this again with the tubular stem or standard C, which carries the cylindrical base A B, it follows that the whole apparatus may be lifted out of the coffee-pot into which it has been inserted by simply taking hold of the handle $i$ without danger of its coming apart or spilling the grounds in removing it.

Another advantage of this construction of the knob or handle $i$ is, that it can be cut off easily or shaved down from the top, so as to fit the height of the pot, and, by impinging against the under side of its cover, will serve to steady and hold the whole apparatus in a vertical position within the pot.

The method of using this attachment will readily be understood by reference to the drawings, from which it will be seen that after the upper cylinder, D E, has been partially filled with ground coffee, and its cover F sprung into position, the whole apparatus is inserted into the coffee-pot G and its cover put on, as shown in Fig. 2; or, when it is desired to use a large-sized coffee-pot and percolator, the apparatus may be constructed and arranged with reference to the pot as shown in Fig. 3, in which case only one cover, F, is used for the whole. In either case the pot is filled with boiling water nearly up to the perforated bottom E, and by letting the water boil briskly for about ten minutes the steam will force the boiling water through the apertures $a$ of the cylindrical base up into the tubular standard C, and out over its top upon the ground coffee contained in the upper cylinder, D E, the steam which follows with the water forcing this, by its pressure in the upper part of the cylinder D, down through the coffee, and back into the pot.

As the cover F is sprung upon the cylinder by its indentations $h$ $h$ and the lugs or catches $g$ $g$ in the manner described, this cannot come off, but admits of considerable steam-pressure within the cylinder, which would not be the case if the cover were simply loosely inserted upon this.

If desired, the cover F and cylinder D may be made in one piece, in which case the foraminated bottom E has a rim or flange, and serves as the detachable cover; but in either case the operation of the device will, of course, be the same. It is also obvious that more than one tube or standard, C, may be employed, if desired, by a corresponding modification of the construction of the bottom E of the upper vessel, D, and its fastening attachments.

I am well aware that it is not new to construct a coffee-percolator consisting of a hollow base and provided with a tubular standard and a removable perforated vessel to contain the ground coffee, resting or supported upon said standard, nor do I claim such construction, broadly; but by the construction and arrangement of parts as hereinbefore described several important advantages are gained, among which are, that the cover F cannot come off accidentally or by the pressure of the steam, and thereby spill or overflow the grounds; the coffee can be tested conveniently during the process of making; the apparatus can be lifted up and out of the pot as a whole without burning the fingers and without coming apart; its several parts are easily detached for cleaning, and the whole apparatus can be manufactured at a small cost and may be used with any kind or style of coffee-pot.

Having thus described my invention, I claim and desire to secure by Letters Patent of the United States—

1. In a percolating attachment for coffee-pots or coffee-percolator of the described class, the combination, with the slotted base A B and its tubular standard C, provided with the annular shoulder $c$ and studs $d$ $d'$, of the detachable coffee-holder D, provided with the foraminated bottom E, having central aperture, $b$, inclined locking-lugs $e$ $e'$, and slots $f f$, substantially as and for the purpose set forth.

2. In a percolating attachment for coffee-pots or coffee-percolator of the described class, the combination of the slotted base A B, having tubular standard C, provided with annular shoulder $c$ and lugs $d$ $d'$, cylindrical vessel or coffee-holder D, having protuberances $g$ $g$, and provided with a foraminated bottom, E, having inclined locking-lugs $e$ $e'$ and slots $f f$, and cover F, having indentations $h$ $h$, sleeve $k$, and knob or handle $i$, inserted into the said sleeve, substantially as and for the purpose herein shown and set forth.

In testimony that I claim the foregoing as my own I have hereto affixed my signature in presence of two witnesses.

MARVIN P. HATHAWAY.

Witnesses:
WILLIAM E. AIKEN,
CHARLES H. HITCHCOCK.